(12) United States Patent  (10) Patent No.: US 8,871,881 B2
Greiner et al.  (45) Date of Patent: Oct. 28, 2014

(54) HYDROPHOBIC FLOURINATED COATING

(75) Inventors: Andreas Greiner, Amoneburg (DE);
Seema Agarwal, Marburg (DE);
Michael Bognitzki, Marburg (DE); Sven Horst, Braunschweig (DE)

(73) Assignee: Philipps-Universität Marburg, Marburg (DE)

( * ) Notice: Subject to any disclaimer, the term of this patent is extended or adjusted under 35 U.S.C. 154(b) by 1999 days.

(21) Appl. No.: 11/884,884

(22) PCT Filed: Feb. 23, 2006

(86) PCT No.: PCT/DE2006/000334
§ 371 (c)(1),
(2), (4) Date: Aug. 26, 2008

(87) PCT Pub. No.: WO2006/089531
PCT Pub. Date: Aug. 31, 2006

(65) Prior Publication Data
US 2009/0010870 A1    Jan. 8, 2009

(30) Foreign Application Priority Data
Feb. 24, 2005 (DE) .................. 10 2005 008 927

(51) Int. Cl.
*C08F 214/18* (2006.01)
(52) U.S. Cl.
USPC .......................... 526/242; 525/461
(58) Field of Classification Search
USPC .......................... 526/242; 525/461
See application file for complete search history.

(56) References Cited

U.S. PATENT DOCUMENTS 4,508,606 A * 4/1985 Andrade et al. ............. 204/169
6,046,246 A * 4/2000 Lowe et al. .................. 521/57

(Continued)

FOREIGN PATENT DOCUMENTS

DE 100 23 456 2/2001
DE 100 53 263 5/2002

(Continued)

OTHER PUBLICATIONS

D. Reneker et al., "Nanometre diameter fibres of polymer, produced by electrospinning", Nanotechnology 7 (1996) 216-223.*

(Continued)

*Primary Examiner* — Peter D. Mulcahy
*Assistant Examiner* — Henry Hu
(74) *Attorney, Agent, or Firm* — Clark & Brody

(57) ABSTRACT

The invention at hand concerns hydrophobic polymer surfaces, in particular superhydrophobic polymer surfaces, comprising at least one homo- or copolymer, which comprises at least one side chain with at least one fluoro-substituted aryl group. Furthermore, the invention at hand concerns a method for the production of polymer surfaces of this type, their use and polymers of the general formula I:

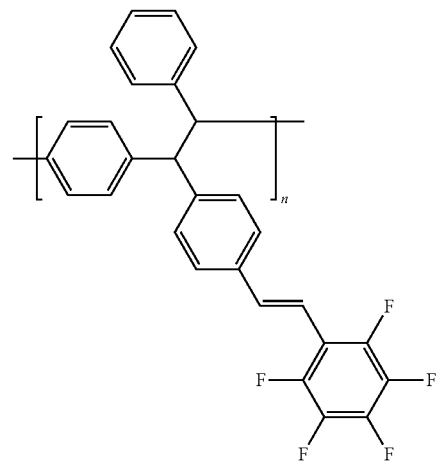

Figure 1:
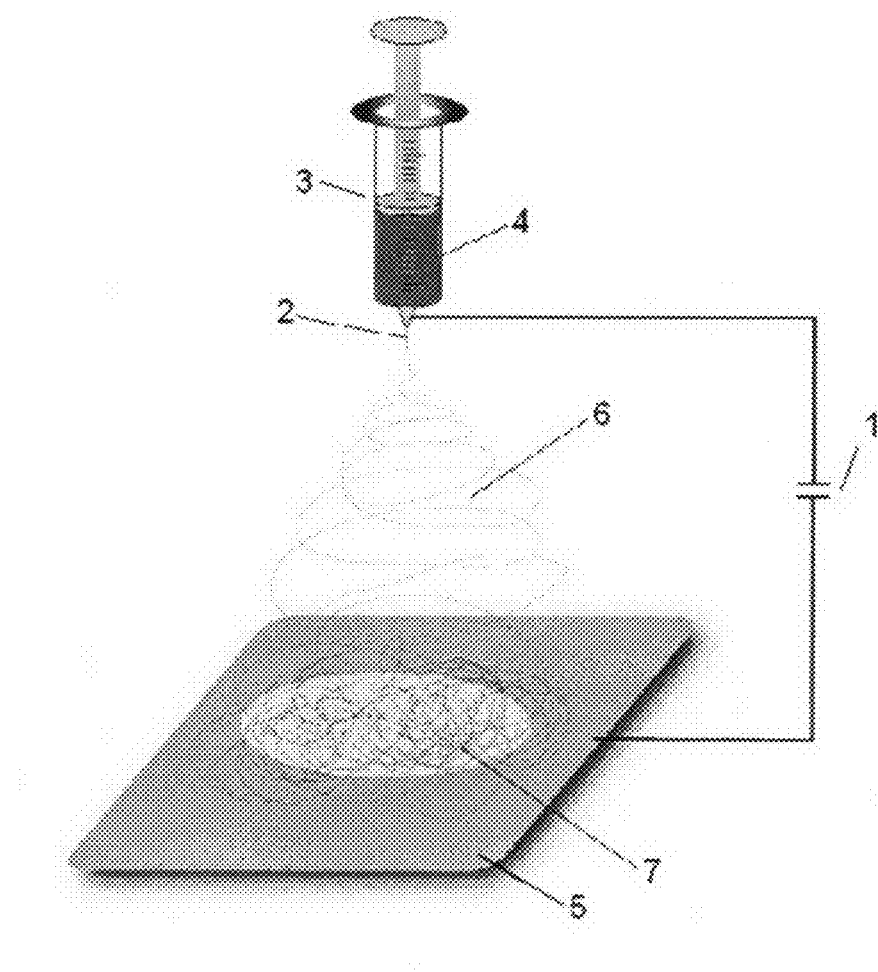

wherein n is an integer between 10 and 4,500, preferably between 20 and 2,200 and particularly preferably between 100 and 670.

21 Claims, 4 Drawing Sheets

(56) References Cited

U.S. PATENT DOCUMENTS

| | | | |
|---|---|---|---|
| 6,303,730 B1 * | 10/2001 | Fries et al. | 528/32 |
| 2002/0084553 A1 * | 7/2002 | Nun et al. | 264/284 |
| 2002/0192385 A1 * | 12/2002 | Jenkner et al. | 427/387 |
| 2004/0192833 A1 * | 9/2004 | Rajagopalan et al. | 524/588 |
| 2009/0264610 A1 * | 10/2009 | Koike et al. | 526/245 |

FOREIGN PATENT DOCUMENTS

| | | |
|---|---|---|
| DE | 100 62 203 | 6/2002 |
| DE | 101 16 232 | 10/2002 |
| DE | 101 29 116 | 12/2002 |
| DE | 101 33 393 | 1/2003 |
| DE | 102 10 668 | 9/2003 |
| DE | 102 54 718 | 6/2004 |
| DE | 10-2005-008-927 A1 * | 2/2005 |
| EP | 772 514 | 5/1997 |
| WO | 96/04123 | 2/1996 |

OTHER PUBLICATIONS

G. Fraenkel et al., "Influence of Substituents on NMR and Barriers to Rotation in *tert*-Benzyllithium Compounds", Journal of the American Chemical Society, vol. 102, No. 9, Apr. 23, 1980, pp. 2869-2880.

P. Gordon et al., "Hypophosphorous acid-iodine: a novel reducing system. Part 2: Reduction of benzhydrols to diarylmethylene derivatives", Tetrahedron Letters 42 (2001) 831-833.

L. Jiang et al., "A Lotus-Leaf-like Superhydrophobic Surface: A Porous Microsphere/Nanofiber Composite Film Prepared by Electrohydrodynamics", Angew. Chem. Int. Ed. 2004, 43, 4338-4341.

\* cited by examiner

HYDROPHOBIC FLOURINATED COATING

The invention at hand concerns a hydrophobic fluorinated polymer surface, in particular a superhydrophobic polymer surface, comprising at least one homo- or copolymer, a method for the production of said polymer surfaces as well as their use.

Surfaces of this type are used in a multitude of applications, for example, in order to equip textiles or facade fronts with water-repellent characteristics and/or to effectively prevent the adhesion of, for example, dirt particles, foodstuffs, microorganisms, paints, inks, resins or plastics on corresponding surfaces. Furthermore, hydrophobic surfaces are also advantageous in devices for the storage and handling of liquids, in particular of aqueous liquids, as this enables a complete emptying of the corresponding devices.

The contact angle is a physical measurement of the hydrophobicity of a surface. With a contact angle of 0°, water forms a monomolecular film on the surface of a solid, whereas with a contact angle of 180°, a drop of water comes into contact with the surface of a solid at only one point. Those surfaces which comprise a contact angle greater than 90° are understood by persons skilled in the art to be hydrophobic, whereas surfaces with a contact angle less than 90° are denominated as hydrophilic. Hydrophobic surfaces with a contact angle greater than or equal to 160° are also denominated as superhydrophobic.

It is known that the microscopic topography of a surface has significant influence on its hydrophilicity/hydrophobicity. Rough surfaces, for example, comprise a larger contact angle than smooth surfaces of the same composition. When observed microscopically, all surfaces comprise depressions and elevations which—depending on the type of surface observed—vary in their depth and height. If the difference between the deepest point of a depression or the highest point of an elevation on one side and the average height of the surface is of less than 0.4 µm, a person skilled in the art denominates this surface smooth; if the difference mentioned, however, is greater than or equal to 0.4 µm or greater than or equal to 10 µm, it is a matter of a micro-rough surface or a rough surface respectively. This influence is used in a multitude of known hydrophobic surfaces.

Hydrophobic, self-cleaning surfaces of objects are known from EP 0 772 514 B1 which comprise an artificial surface structure of elevations and depressions, wherein the distance between said elevations is in the range of 5 to 200 µm, the height of said elevations is in the range of 5 to 100 µm, and said elevations, at least, comprise hydrophobic polymers, and said elevations cannot be detached by water or detergents. For the production of these surface structures, coating a smooth surface made of plastic material with a thin layer of glue and, subsequently, with a Teflon powder, for example, is proposed. The disadvantage of this method is, however, that it is complex and, in particular, is not suitable for being carried out in a reproducible manner.

DE 100 62 203 A1 discloses a method for embossing hydrophobic polymers with metallic punches or embossing rolls for the purpose of applying structures with a height of 50 nm to 1,000 µm, respectively, and a distance between the structures of 50 nm to 500 µm, wherein the punches or embossing rolls are hydrophobicized with, for example, fluoro-organosilanes before the first embossing procedure.

Hydrophobic polymer fibers with self-cleaning properties, which comprise particles with an average particle diameter of 20 nm to 100 µm on their surface, wherein the particles on their surface preferably have an irregular fine structure in the nanometer scale, are known from DE 101 29 116 A1. Hereby, the particles to be applied comprise hydrophobic properties or are treated with hydrophobic compounds, which are preferably selected from the group comprising alkylsilanes, fluoroalkylsilanes and disilazanes, before or after being applied to the polymer surface.

Furthermore, in DE 102 10 668 A1, devices produced by means of the injection molding method are described, which comprise a firmly anchored layer of hydrophobic microparticles on their surface, which preferably have elevations of an average height of 20 nm to 25 µm and an average distance of 20 nm to 25 µm. Hereby, the microparticles are applied to the injection mold before the injection molding and impressed into the surface of the injection-molded part during the subsequent injection molding. Application of the microparticles is carried out through the application of a suspension of particles and solvent or an aerosol which contains particles and gas propellant to the injection mold and subsequent evaporation of the solvent.

Moreover, a self-cleaning composite material based on a substrate provided with a plurality of openings with a porous, inorganic coating found on and in this substrate is known from DE 102 54 718 A1, wherein the interior and/or exterior surfaces of the composite material are provided at least in part with a structure comprising elevations with an average height of the elevations of 1 nm to 100 µm and an average distance between the elevations of 1 nm to 100 µm, which are formed by hydrophobic microparticles. Hereby, the particles are suitable, optionally, for being provided with hydrophobic properties, by treatment with at least one compound selected from the group comprising alkylsilanes, fluoroalkylsilanes and disilazanes. Fixing of the particles on the composite material is carried out by heating to a temperature of 100° C. to 400° C.

A disadvantage of the aforementioned surfaces is their production, which is complex and partly unable to be reproduced. Additionally, these comprise, in part, a very limited hydrophobicity.

Lei Jiang, Yong Zhao and Jin Zhai report about the production of hydrophobic composites of nanofibers and beads through electrospinning a solution of 6 to 10 wt.-% polystyrene in dimethylformamide in "*A Lotus-Leaf-like Superhydrophobic Surface: A Porous Microsphere/Nanofiber Composite Film Prepared by Electrohydrodynamics*", Angew. Chem. Int. Ed. 2004, pp. 4338-4341. The composites obtained with this method comprise a contact angle of approx. 160° in water, wherein, in the composites, microspheres and nanofibers are densely distributed over the entire substrate, almost all nanofibers are interwoven in a stable, three-dimensional network and the microspheres are embedded in this network. Hereby the microspheres have a size of 3 µm to 7 µm, and the microfibers of 60 µm to 140 µm. According to the teachings of the aforementioned article, the morphology of the composite depends on the concentration of the spun solution. While a high polymer concentration of 20 to 30 wt.-% in the spinning solution leads to the formation of ultrafine fibers with low hydrophobicity, a diluted spinning solution with a polymer concentration of 2 to 3 wt.-% is supposed to lead to the formation of microparticles, which, however due to their low density, do not attach to a substrate surface, and are, thus, unsuitable for a polymer surface. The formation of the hydrophobic composites described thus represents a mesostate between both aforementioned conditions and only occurs with a polymer concentration of 6 to 10 wt.-% in the spinning solution. A disadvantage of this method lies in the low hydrophobicity of the polymer material used, polystyrene, so that composites with satisfactory hydrophobicity are only obtained in the case of corresponding realization of the composite surface.

The aim of the invention at hand is to provide polymer surfaces which are suitable for being produced simply and in a reproducible manner and comprise a high hydrophobicity.

According to the present invention, this aim is achieved through a polymer surface with the characteristics in patent claim 1.

Surprisingly, it was found in the context of the invention at hand that polymer surfaces comprising at least one homo- or copolymer, which comprises at least one side chain with at least one fluoro-substituted aryl group, comprise a high hydrophobicity. In particular, it was unexpected for persons skilled in the art that polymer coatings of this type, in the case of corresponding surface structure, comprise superhydrophobic properties characterized by a contact angle greater than or equal to 160° or a water-roll angle of 0°. A further advantage of the polymer coatings according to the present invention lies in their ability to be produced simply and in a reproducible manner, for example through electrospinning of a corresponding polymer solution.

Good results are obtained, in particular, when the hydrophobic polymer surface contains at least one homo- or copolymer, which comprises at least one side chain with a mono-, di-, tri-, tetra- and/or pentafluorophenyl group.

According to a further preferred embodiment of the invention at hand, the homo- or copolymer of the hydrophobic polymer surface comprises at least one side group with a 2,3,4,5,6-pentafluorophenyl group, 2-fluorophenyl group, 3-fluorophenyl group and/or 4-fluorophenyl group.

In principle, the fluoro-substituted aryl groups provided according to the present invention are suitable for covalently binding to the primary polymer chain in every way known to persons skilled in the art. For example, these groups are suitable for binding to the primary chain via a spacer group, wherein good results are achieved, in particular, with $C_1$-$C_{20}$-alkyl groups, preferably $C_1$-$C_5$-alkyl groups and particularly preferably methylene and/or ethylene groups as spacers. However, the at least one fluoro-substituted aryl group is very particularly preferably bound covalently to the primary polymer chain immediately or directly.

In a further refinement of the inventive concept, it is proposed to provide a homo- or copolymer, which comprises at least 10 mol-%, preferably at least 20 mol-%, particularly preferably at least 30 mol-% and very particularly preferably 30 to 70 mol-% fluoro-substituted aryl groups in the side chains, in the hydrophobic polymer surface. Surfaces of this type comprise a particularly high hydrophobicity.

According to a further preferred embodiment of the invention at hand, the hydrophobic polymer surface comprises at least one homopolymer selected from the group comprising 2,3,4,5,6-polypentafluorostyrene, poly-2-fluorostyrene, poly-3-fluorostyrene, poly-4-fluorostyrene, F5-PPX, as well as homopolymers of 2-fluoroaryl-/3-fluoroaryl-/4-fluoroaryl-/ and 2,3,4,5,6-pentafluoroaryl-substituted vinyl monomers, wherein a polymer of the general formula I is described as F5-PPX in the sense of the invention at hand

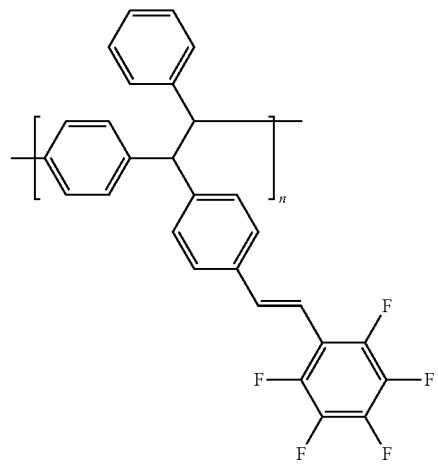

wherein n is an integer between 10 and 4,500, preferably between 20 and 2,200 and particularly preferably between 100 and 670.

Equally preferably, the hydrophobic polymer surface according to the present invention comprises at least one copolymer from one monomer selected from the group comprising 2,3,4,5,6-pentafluorostyrene, 2-fluorostyrene, 3-fluorostyrene, 4-fluorostyrene, F5-PPX and combinations thereof and one monomer selected from the group comprising styrene, substituted styrene derivatives, 5,6-benzo-2-methylene-1,3-dioxepane, methyl methacrylate, N-phenylmaleimide and combinations thereof. Hereby, the monomers in the copolymer are suitable for being present statistically, in blocks or in a tactical arrangement. Graft copolymers have also proven themselves to be suitable.

According to the present invention, the hydrophobic polymer surfaces are suitable for comprising one or two or more of the aforementioned homo- and copolymers, in any combination with each other.

Particularly good results are obtained with hydrophobic polymer surfaces which comprise at least 50 wt.-%, preferably at least 70 wt.-%, particularly preferably at least 90 wt.-% and very particularly preferably 100 wt.-% of one or two or more of the aforementioned homo- and copolymers, in any combination with each other.

According to a further preferred embodiment of the invention at hand, the at least one homo- or copolymer comprises a weight-averaged molecular weight of 1,000 to 2,000,000 g/mol, preferably from 10,000 to 1,000,000 g/mol and particularly preferably from 50,000 to 300,000 g/mol.

In a further refinement of the inventive concept, it is proposed to provide the hydrophobic polymer surfaces in the form of particles or particles connected via fibers. Through this, a rough polymer surface is achieved, which leads to an increase in the hydrophobicity of the surface. In particular, polymer surfaces of this type are also suitable for being superhydrophobic.

Preferentially, the average diameter of the particles is less than 3 μm, preferably between 1 nm and 2 μm and particularly preferably between 500 nm and 1 μm.

According to a further preferred embodiment of the invention at hand, the polymer coatings comprise elevations and/or depressions in the nanometer scale. Preferentially, the elevations and/or depressions comprise an average height of 20 nm to 500 nm, particularly preferably from 20 nm to 200 nm. The distance between the elevations or depressions on the particles is preferably less than 500 nm, very particularly preferably less than 200 nm. The craggy structures with elevations and/or depressions in the nanometer scale are suitable for being formed, e.g., by cavities, pores, grooves, pikes and/or spokes. Additionally, the particles are suitable for being particles in accordance with DIN 53 206. Particles or particle components according to this standard are suitable for being individual particles, but also aggregates or agglomerates, wherein, according to DIN 53 206, aggregates are understood to be primary particles (particles) arranged in surface- or edge-contact to each other and agglomerates are understood to be primary particles (particles) arranged with a point-to-point contact between each other. Particles are also those which form agglomerates or aggregates combining primary particles. The structure of these particles is suitable for being spherical, moderately aggregated, nearly spherical, extremely highly agglomerated or porously agglomerated. The preferable size of the agglomerates or aggregates is between 20 nm and 100 µm, particularly preferred between 200 nm and 30 µm.

As long as the polymer coatings according to the present invention comprise the form of fibers, their diameter is preferably 10 nm to 50 µm, particularly preferably 50 nm to 2 µm and very particularly preferably 100 nm to 1 µm.

Fundamentally, the polymer surfaces according to the present invention are suitable for being produced with all methods known to persons skilled in the art, wherein, in particular, production through the electrospinning method has proven itself to be particularly suitable. With the electrospinning method, which is described, for example, by D. H. Reneker, H. D. Chun, *Nanotechn.* 7 (1996), pages 216-217, in DE 101 33 393 A1, DE 101 16 232 A1, DE 100 53 263 A1 and DE 100 23 456 A1, which are introduced herewith as reference and count as a part of the disclosure, a polymer melt or a polymer solution is exposed to a high electric field on an edge serving as an electrode. This can be achieved in that the polymer melt or polymer solution is extruded through a cannula connected to a pole of a power supply in an electric field under low pressure. Due to the thereby resulting electrostatic charge of the polymer melt or polymer solution, a material flow directed towards the counter electrode, which hardens on the way to the counter electrode, occurs. Depending upon the geometries of the electrodes, fleeces or so-called non-wovens or ensembles of oriented fibers, particles or particles connected to each other through fibers are obtained with this method.

According to a further preferred embodiment of the invention at hand, the hydrophobic polymer surface comprises a contact angle of at least 120°, preferably of at least 140° and particularly preferably of at least 160° in water and/or a water-roll angle of maximally 50°, preferably of maximally 40° and particularly preferably of 0°.

Fundamentally, all bases, in particular those made from plastic, metal or an alloy, are suitable for the polymer coatings according to the present invention. In particular, PET substrates coated with aluminum have proven themselves to be particularly suitable.

A further subject matter of the invention at hand is a method for the production of hydrophobic polymer surfaces according to the present invention, in which a solution containing at least one homo- or copolymer, which comprises at least one side chain comprising at least one fluoro-substituted aryl group, is electrospun in a solvent.

Particularly good results are obtained when a solution of one or several of the aforementioned polymers is electrospun in an organic solvent or solvent mixture, wherein the solvent is preferably selected from the group comprising tetrahydrofuran, dimethylformamide, trichloromethane and combinations thereof. A mixture of tetrahydrofuran (THF) and dimethylformamide (DMF) is particularly preferably used as the solvent, in particular a 1:1 v/v mixture thereof.

In a further refinement of the inventive concept, it is proposed to electrospin a solution with a polymer concentration, in relation to the solution, of 0.5 to 20 wt.-%.

According to a further preferred embodiment of the invention at hand, the concentration of the polymer solution used is chosen in such a way that the polymer surface formed through electrospinning take on the form of particles or particles connected through fibers, wherein corresponding particles preferably comprise an average diameter of less than 3 µm, in particular between 1 nm and 2 µm and particularly preferably between 500 nm and 1 µm. Thereby, polymer surfaces with particularly high hydrophobicity are obtained, in particular superhydrophobic polymer surfaces with a contact angle of greater than or equal to 160° and/or a water-roll angle of 0°. The value of the optimal polymer concentration is dependent in the first instance on the composition of the polymers and, alongside that, on the concrete electrospinning parameters, and can easily be determined in the framework of standard experiments. Solutions with a polymer concentration, in relation to the solution, of 1 to 10 wt.-%, preferably 1 to 5 wt.-% and particularly preferably 2 wt.-% have proven themselves to be particularly suitable for solutions, which are to be electrospun, of a homopolymer selected from the group comprising poly-2,3,4,5,6-pentafluorostyrene, poly-2-fluorostyrene, poly-3-fluorostyrene, poly-4-fluorostyrene and F5-PPX and a copolymer comprising a monomer selected from the group comprising 2,3,4,5,6-pentafluorostyrene, 2-fluorostyrene, 3-fluorostyrene, 4-fluorostyrene and F5-PPX and a monomer selected from the group comprising styrene and 5,6-benzo-2-methylene-1,3-dioxepane.

Preferably, in the electrospinning method, the distance between the cannula and the counter electrode functioning as a collector, as well as the tension between the electrodes is set in such a way that an electric field of preferably 0.5 to 5 kV/cm, particularly preferably 1.0 to 3.0 kV/cm and very particularly preferably 1.5 to 2.5 kV/cm is formed between the electrodes.

Good results are achieved, in particular, when the interior diameter of the cannula is 50 to 500 µm.

In a further refinement of the inventive concept, it is proposed to arrange the electrodes at a distance of 1 to 50 cm and particularly preferably at a distance of 10 to 20 cm in the electrospinning method.

While the supply of polymer solution through the cannula is preferably between 0.1 and 10 ml/h, particularly preferably between 0.1 and 1 ml/h and very particularly preferably between 0.15 and 0.40 ml/h, the coating time is preferably between 10 and 200 minutes and particularly preferably between 40 and 110 minutes.

Furthermore, the invention at hand concerns hydrophobic polymers of the general formula I:

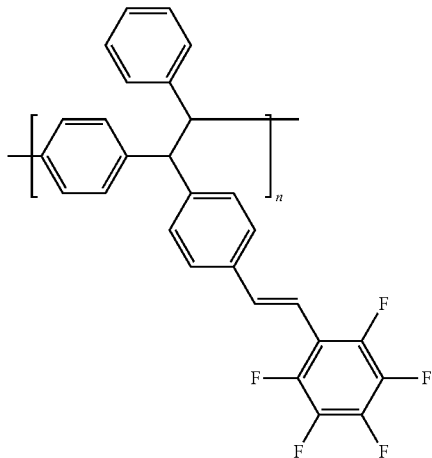

wherein n is an integer between 10 and 4,500, preferably between 20 and 2,200 and particularly preferably between 100 and 670.

A further subject matter of the invention at hand are copolymers comprising at least one monomer of the general formula II:

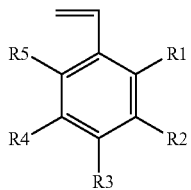

wherein
R1=R2=R3=R4=R5=F or
R1=R2=R4=R5=F and R3=F,
wherein copolymers of 5,6-benzo-2-methylene-1,3-dioxepane and one monomer of the formula II are particularly preferable.

The hydrophobic polymer coatings according to the present invention, in particular superhydrophobic polymer coatings, are suitable for the production of surfaces for all types of everyday objects, which should have a water-repellent effect, for example for plastic coverings and inspection windows. Furthermore, the particles are suitable for applications, in which the adhesion of dirt particles, foodstuffs, micro organisms, paints, inks, resins or plastics are to be prevented. Furthermore, surfaces with a highly reduced wettability compared to water comprise a considerably reduced inclination to freezing.

Due to their self-cleaning and water-repellent properties, the polymer coatings according to the present invention are, furthermore, advantageous for use as a surface coating in carpets, threads, cords, wall hangings, textiles, wallpapers, clothes, tents, decor curtains, stage curtains and seams. The polymer coatings are suitable, in particular, for the production of clothes, which are exposed to high amounts of dirt and water, in particular those for skiing, alpine sports, motor sports, motorbike sports, motocross sports, sailing, for textiles used for leisure activities and for work clothing, as well as technical textiles such as tents, marquees, umbrellas, tablecloths and convertible roofs. The textiles are suitable for being applied, for example, in the form of fabrics, knits, fleeces or felts.

A further area of application of the hydrophobic polymer coatings according to the present invention are devices for the storage of liquids, which should be emptied of the stored liquid as completely as possible.

Pipette tips or similar tools are often used for defined uptake and distribution of liquids. With the help of these pipette tips, liquids can be taken from a storage container or defined amounts of liquid can be transferred from one container into another. In molecular biology, sometimes volumes in the microliter or nanoliter scale are pipetted in high throughput screening or in combinatorial chemistry. However, with the pipette tips available on the market today, it is not possible to pipette any small amount without contact, i.e. pipetting in such a way that the liquid to be pipette detaches from the pipette tip completely and independently. With pipette tips provided with the superhydrophobic polymer surfaces, even volumes of less than 500 nl can be pipetted without contact.

From another technical area, namely the biological/pharmaceutical industry, the problem of the packaging of biological and/or pharmaceutical products—mostly in solution— and the incomplete, undiluted removal of these solutions from the packaging is known. Ampullae from plastic with or without a closure are typical packaging. Moreover, high-quality biological or pharmaceutical products are often packaged in very small amounts. This is due, for one, to the high effectiveness of these preparations and, for another, on the very high price of these substances. Volumes of less than 100 μl are no exceptions here. It can be observed that such solutions and preparations are usually only suitable for incomplete removal from these containers. This is problematic in many respects, e.g. because the containers can only be disposed of as hazardous waste, so that either less than the indicated and, thus, usually prescribed amount of preparation is applied or that, in order to be able to apply the prescribed amount, another container must be opened, with the disadvantage that a larger remnant of expensive preparation must be discarded. The hydrophobic polymer coatings according to the present invention are also suitable for being used advantageously for these applications, in particular superhydrophobic polymer coatings, in particular for use in pipette tips, syringes, ampullae and storage containers for biological and/or pharmaceutical products, in which liquids must be distributed to small areas and/or the liquid collects on fluid-wettable areas through light shaking or light tilting of the container.

A further application area for the polymer coatings according to the present invention is the use in devices for biotechnology. Bacteria and other microorganisms require water for adhesion to a surface, which is not available on the superhydrophobic surfaces of the polymer coatings according to the present invention. The superhydrophobic surfaces of the particles according to the present invention, thus, prevent the growth of bacteria and other microorganisms on the liquid-repellent areas; they are thus also bacteriaphobic and/or antimicrobial. The surfaces of the devices for biotechnology are either completely or only in partial areas equipped with superhydrophobic particles. If it concerns a device for biotechnology in which only a part of the surface is equipped with superhydrophobic particles according to the present invention, then localized growth of bacteria and other microorganisms occurs on the partial areas of the device surface which are wettable. Since the effect on which the superhydrophobic partial areas of the device surface is based is not dependent on antimicrobial active agents, but on a physical effect, interference with the growth of bacteria and microorganisms on the fluid-wettable partial areas through the water-repellent areas—for example through bleeding and/or diffusion of active agents—is impossible.

Figure 2:
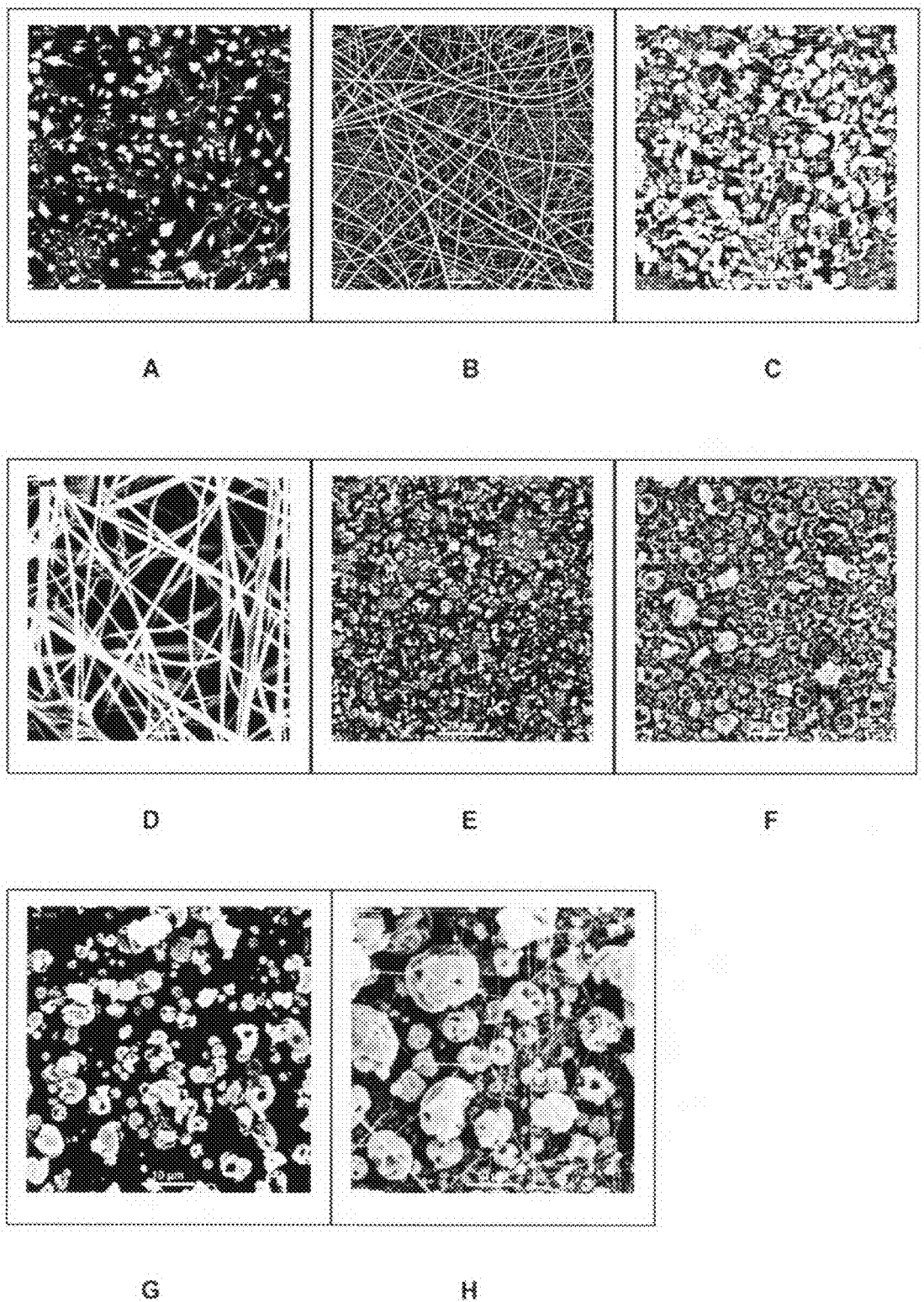
Figure 3:
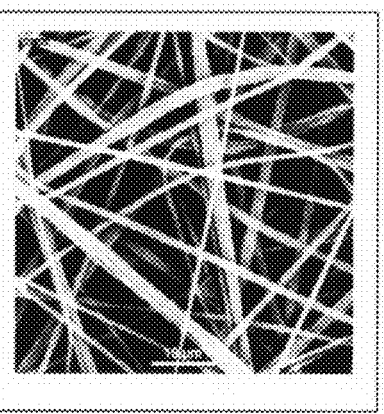
Figure 3:
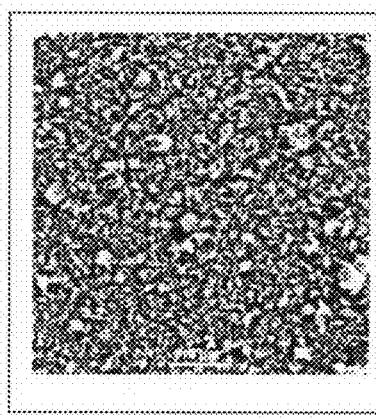
Figure 3:
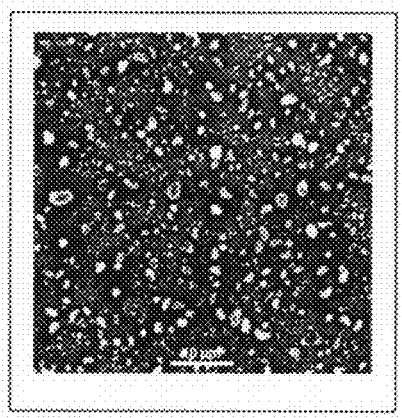
Figure 3:
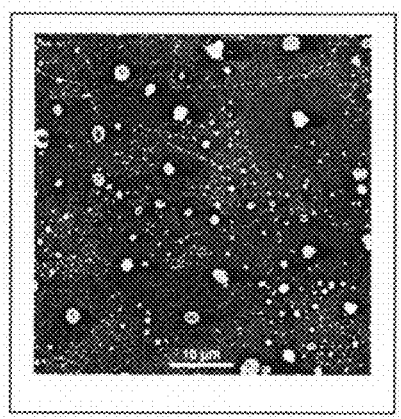

Further characteristics, details and advantages of the invention are described in the text of the claims, as well as the following description of embodiments with the figures. It shows:

FIG. 1 a schematic representation of a device suitable for carrying out the method according to the present invention, FIG. 2 electron micrograph of the polymer surfaces obtained in the embodiments 2 (A), 3 (B), 6 (C), 7 (D), 8 (E), 9 (F) and 10 (G), as well as in comparative embodiment 1 (H) and FIG. 3 electron micrographs of the polymer surfaces obtained in the embodiments 11 (A) and 12 (B), as well as in the comparative embodiments 2 (C) and 3 (D)

Figure 4A:
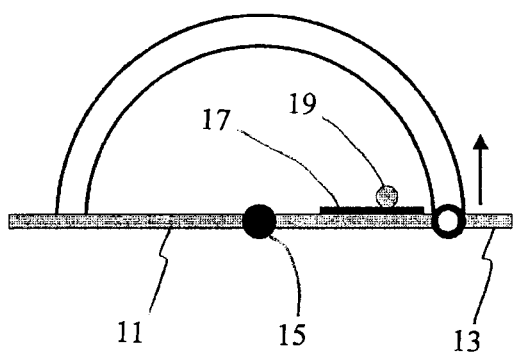

FIG. 4*a* shows an apparatus for measuring water roll angle.

Figure 4B:
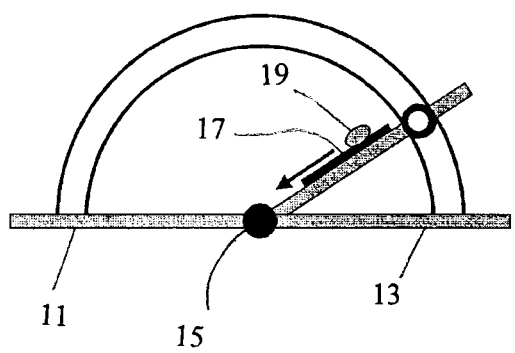

FIG. 4*b* shows the apparatus of FIG. 4*a* in use.

The device for electrospinning, represented in FIG. 1, suitable for carrying out the method according to the present invention, comprises a syringe 3 provided with a capillary nozzle 2 connected at its tip to a pole of a power supply 1 for the uptake of the polymer solution 4. Opposite the mouth of the capillary nozzle 2, a quadratic counter electrode 5, which functions as a collector for the polymer surfaces formed in the form of fibers, particles or particles connected to each other through fibers, is arranged connected with the other pole of the power supply 1 at a distance of 10 to 20 cm.

During the operation of the device, a tension between 30 kV and 50 kV is set on the electrodes 2, 5 and the polymer solution 4 is delivered through the capillary nozzle 2 or the syringe 3 under low pressure. Due to the electrostatic charge of the polymers in the solution resulting from the strong electric field of 1.5 to 2.5 kV/cm, a material flow directed towards the counter electrode 5 occurs, which hardens on the way to the counter electrode 5 under fiber or particle formation 6, as a result of this, fibers 7, particles connected to each other through fibers or particles with diameters in the micro- and nanometer scale deposit on the counter electrode 5.

With the aforementioned device, according to the present invention, a solution of at least one homo- or copolymer, which comprises at least one side chain with at least one fluoro-substituted aryl group, is electrospun in a suitable solvent, such as THF/DMF (1:1 v/v).

Synthesis Embodiment 1

(Production of Different Homo- and Copolymers Based on, if Necessary, Fluoro-Substituted Styrene)

2,3,4,5,6-polypentafluorostyrene (PPFS) (25), poly-4-fluorostyrene (4-FPS) (26), polystyrene (PS) (27), a copolymer (28) from 2,3,4,5,6-pentafluorostyrene (PFS) (22) and styrene (St) (24), as well as a copolymer (30) from 2,3,4,5,6-pentafluorostyrene (22) and 5,6-benzo-2-methylene-1,3-dioxepane (BMDO) (29) were produced through radical polymerization.

The production of 2,3,4,5,6-polypentafluorostyrene (PPFS) (25), poly-4-fluorostyrene (4-FPS) (26) and polystyrene (PS) (27) occurred according to the following reaction scheme:

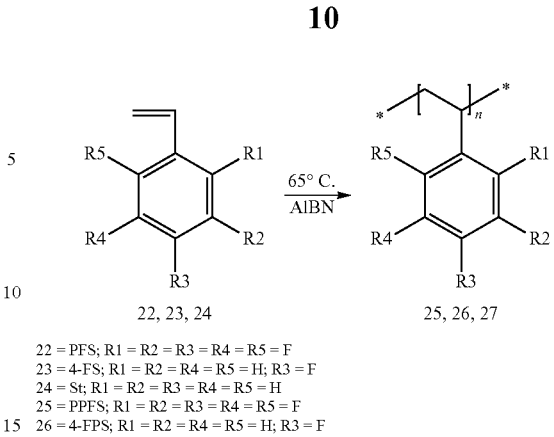

22 = PFS; R1 = R2 = R3 = R4 = R5 = F
23 = 4-FS; R1 = R2 = R4 = R5 = H; R3 = F
24 = St; R1 = R2 = R3 = R4 = R5 = H
25 = PPFS; R1 = R2 = R3 = R4 = R5 = F
26 = 4-FPS; R1 = R2 = R4 = R5 = H; R3 = F
27 = PS; R1 = R2 = R3 = R4 = R5 = H

The production of the copolymer (28) formed of 2,3,4,5,6-pentafluorostyrene (PFS) (22) and styrene (St) (24), as well as the copolymer (30) formed from 2,3,4,5,6-pentafluorostyrene (22) and 5,6-benzo-2-methylene-1,3-dioxepane (BMDO) (29) occurred according to the following reaction scheme:

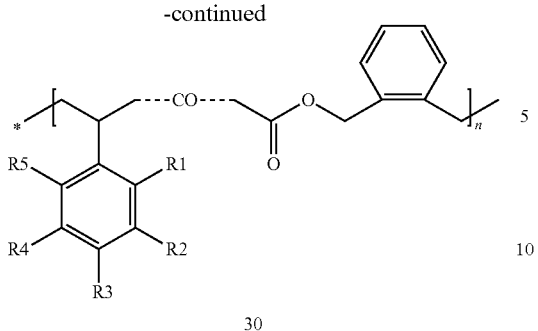

29 = BMDO

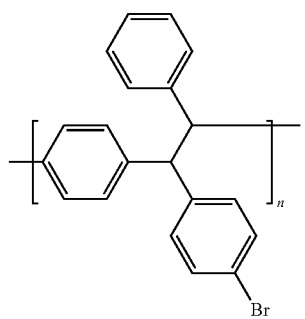

Br-PPX

The homo- and copolymerizations were carried out at 65° C., respectively, wherein azobisisobutyronitrile (AIBN) was used as a radical starter.

In the case of the copolymer poly(2,3,4,5,6-pentafluorostyrene-co-5,6-benzo-2-methylene-1,3-dioxepane) (30), a combination from classic vinyl and radical ring-opening polymerization was applied. The copolymer had a composition of 95:5 mol.-% PFS:BMDO.

Reaction Conditions:
substance polymerization at 120° C.; length: 30 minutes
Characterization:
PPFS (25): $M_w$=30,000-110,000,
4-FPS (26) $M_w$=70,000-120,000,
PS (27): $M_w$=40,000-660,000,
Poly(PFS-co-St) (28): $M_w$=100,000-210,000,
Poly(PFS-co-BMDO) (30): $M_w$=30,000-35,000.

Synthesis Embodiment 2
(Production of Different Fluoro-Substituted Poly-P-Xylylene Homopolymers)

The following fluorinated and non-fluorinated derivatives based on poly-p-xylylene (PPX) were produced:

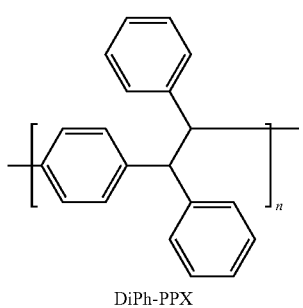

DiPh-PPX

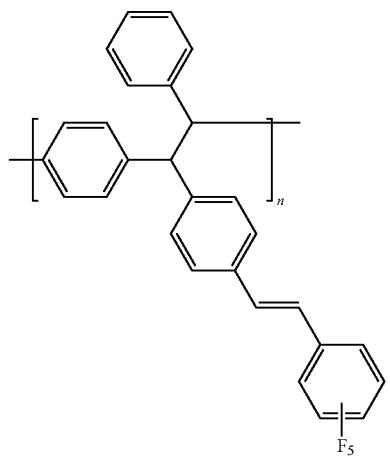

F5-PPX

Synthesis Scheme of the Starting Materials

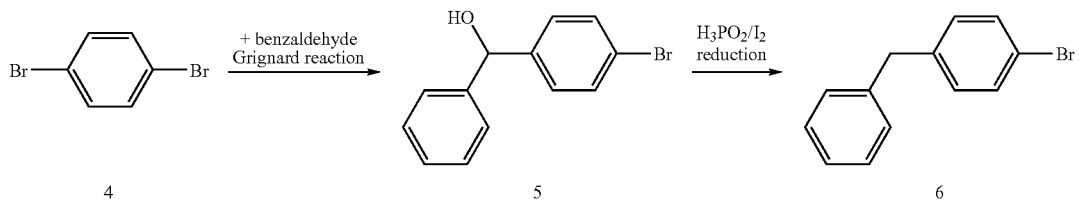

+ benzaldehyde
Grignard reaction

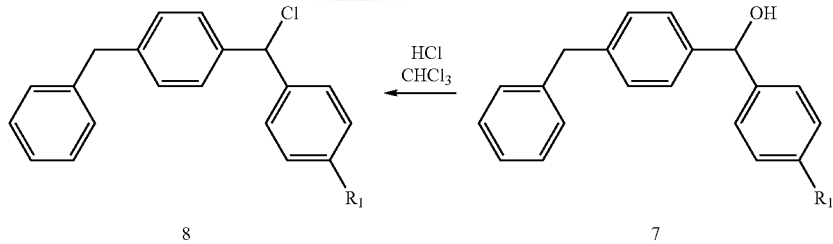
Polymer Synthesis of the PPX Derivatives
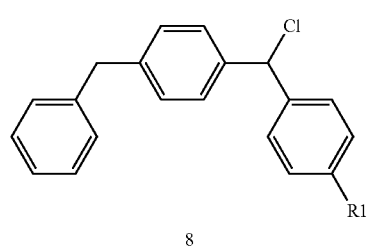
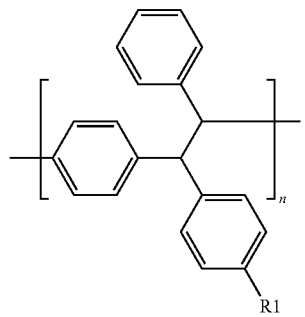
Fluorinated PPX Derivative Through Polymer-Analogous Reaction
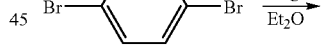
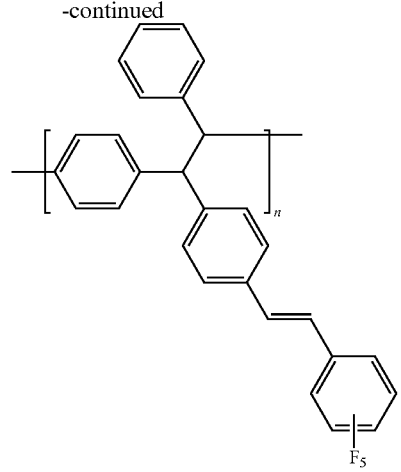
1. Production of bromobenzhydrol (5)
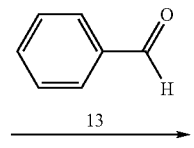
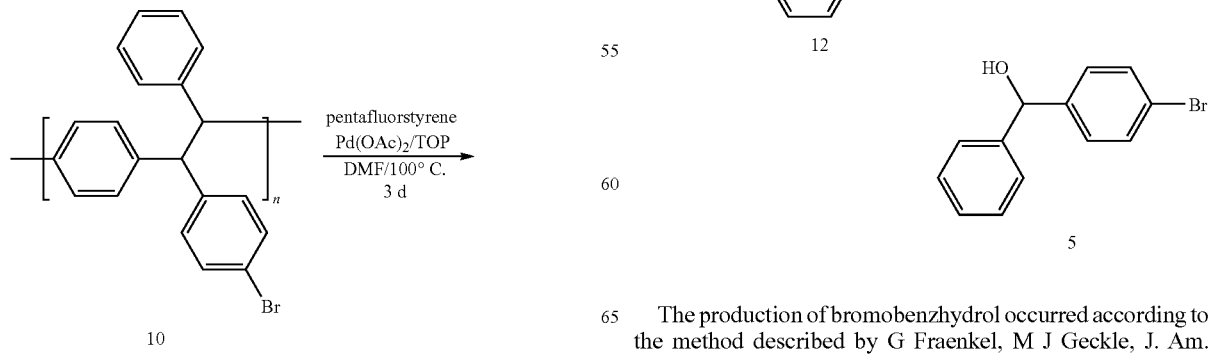
The production of bromobenzhydrol occurred according to the method described by G Fraenkel, M J Geckle, J. Am. Chem. Soc. 1980, 102, 2869-2880.

In a 2 l three-necked flask, preheated and filled with argon, with dropping funnel and reflux condenser, 14.6 g (600 mmol, 1.20 eq.) magnesium turnings were provided in 50 ml dry diethyl ether and stirred for 20 min. Subsequently, a grain of iodine was added for activation and stirred again for 20 min. A solution of 117.0 g (500 mmol, 1.00 eq.) dibromobenzene (4) in 500 ml diethyl ether was added dropwise, before being heated under reflux for 1 h after addition of the diethyl ether was finished.

Subsequently, 47.7 g (450 mmol, 0.9 eq.) of freshly distilled benzaldehyde (13) dissolved in 400 ml diethyl ether was added dropwise and heated under reflux again for 2 h.

For hydrolysis, the reaction mixture was poured on ice after cooling to room temperature and adjusted to pH 3-4 with 1N HCl. The organic phase was separated and the aqueous was extracted three times with 150 ml of chloroform respectively. The combined organic phases were neutralized with 200 ml saturated $NaHCO_3$ solution and dried over $Na_2SO_4$. The solvent was distilled off with a rotary evaporator and the raw product was dried for 5 h in high vacuum at $5\times10^3$ mbar.

The product ratio obtained after the reaction was determined through GC/MS analysis with the apparatus characterized below
Type: SHIMADZU, QP 5050
Column: SE-54, 30 m
Method:
  Start temperature: 100° C.
  Rate of heating: 10° C./min
  End temperature: 280° C.

| Retention time/min | Product yield/% | Identification |
| --- | --- | --- |
| 5.62 | 0.2 | Dibromobenzene |
| 11.34 | 2.1 | Benzhydrol |
| 15.09 | 86.3 | 4-bromobenzhydrol (5) |
| 21.98 | 11.4 | α,α'-dihydroxydiphenyl-p-xylene |

The product mixture obtained in this way was reduced in the next synthesis step without further cleaning or characterization.

2. Synthesis of 4-bromodiphenylmethane (6)

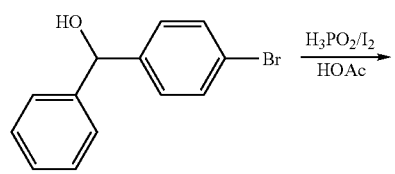

5

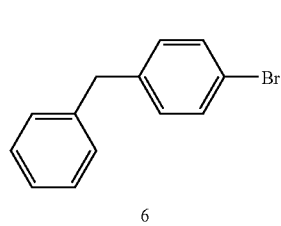

6

The production of 4-bromodiphenylmethane occurred according to the method described in P E Gordon, A J Fry, Tetrahedron Lett. 2001, 42, 831-833.

In a 1 l three-necked flask, filled with argon, with reflux condenser and interior thermometer, the 4-bromobenzhydrol (5) was dissolved in 500 ml glacial acetic acid and 113 g (445 mmol) iodine and 226 ml 50% hypophosphorous acid (2.2 mol) were added. The mixture was heated for 24 h to 78-82° C.

After cooling to room temperature, the reaction mixture was poured in approx. 700 ml ice water and extracted five times with 200 ml hexane respectively. The combined organic phases were washed with 10% KOH solution, until an acid-base indicator, whose color change is in the pH range between 6 and 8, no longer indicated any acid reaction in the aqueous phase. Subsequently, it was washed once with 200 ml saturated ammonium chloride solution and twice with saturated $Na_2SO_3$ solution. The solvent was distilled off with the rotary evaporator and the raw product was distilled in high vacuum at $5\times10^{-3}$ mbar.

Yield: 68 g (276 mmol, 61%)

Boiling temperature: 103° C. (at $5\times10^{-3}$ mbar)

3. Production of 4-benzylbenzhydrol (16) and 4-benzyl-4'-bromobenzhydrol (17)

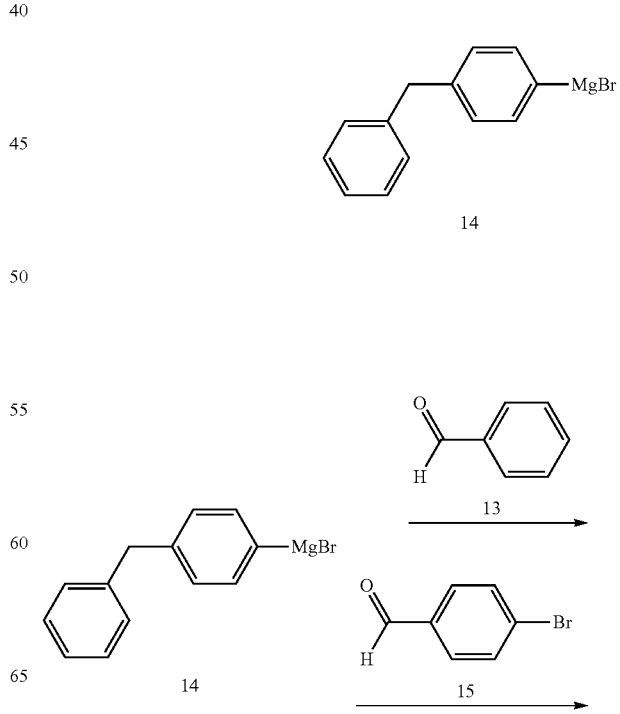

-continued

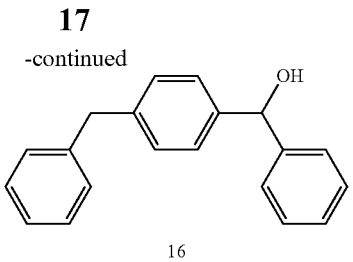

16

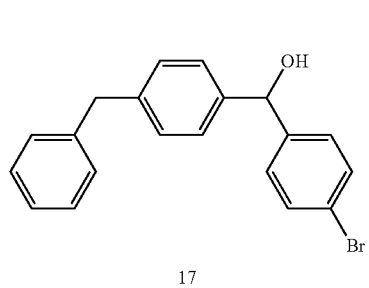

17

In a 500 ml three-necked flask, preheated and filled with argon, with dropping funnel and reflux condenser, 3.04 g (125 mmol, 1.25 eq.) magnesium turnings were provided in 25 ml dry THF and activated with two drops 1,2-dibromoethane. A solution of 29.6 g (120 mmol, 1.20 eq.) 4-bromodiphenyl-methane (6) in 60 ml THF was added dropwise. After successful addition, it was heated under reflux for 1 h.

Subsequently, 100 mmol (1.00 eq.) of the respective aldehyde (13) or (15) dissolved in 70 ml THF was added dropwise and heated under reflux again for 2 h.

For hydrolysis, the reaction mixture was poured on ice after cooling to room temperature and adjusted to pH 3-4 with 1N HCl. The organic phase was separated and the aqueous was extracted three times with 70 ml chloroform respectively. The combined organic phases were neutralized with 100 ml saturated NaHCO$_3$ solution and dried over Na$_2$SO$_4$. The solvent was distilled off with a rotary evaporator and the raw product was dried for 5 h in high vacuum at $5 \times 10^{-3}$ mbar. The raw product was dissolved in chloroform and filtrated over silica gel G60. Subsequently, it was distilled off from the solvent and the pre-cleaned product was recrystallized from the hexane/chloroform mixture (8:2 v/v).

Yields:

4-benzylbenzhydrol (16): 23.6 g (86 mmol, 86%)

4-benzyl-4'-bromobenzhydrol (17): 26.5 g (75 mmol, 75%)

4. Chlorination with HCl

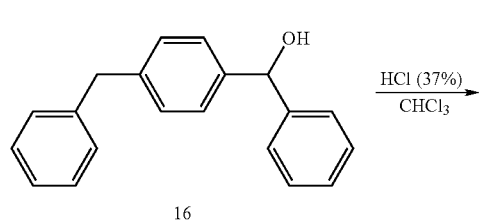

16

-continued

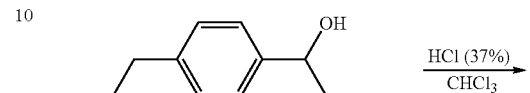

18

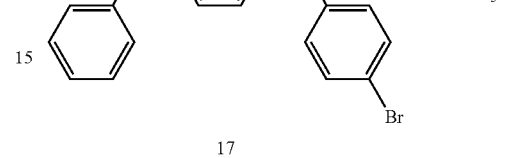

17

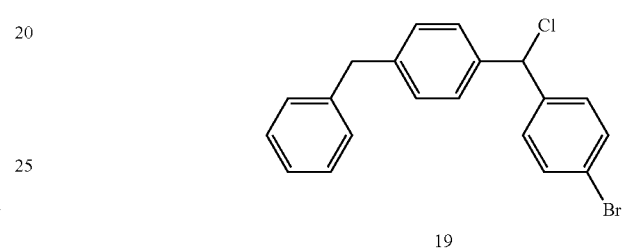

19

In a 250 ml three-necked flask, with dropping funnel and reflux condenser, 62 mmol of the respective alcohol (16) or (17) was dissolved in 100 ml chloroform and cooled to 0° C. 60 ml conc. hydrochloric acid (37% p.a.) was added to this solution dropwise and stirred for 20 min. at 0° C. after finished addition. Subsequently, it was heated under reflux for 1 h.

After cooling to room temperature, the organic phase was separated and the aqueous phase was extracted three times with chloroform. The combined organic phases were neutralized with saturated NaHCO$_3$ solution and dried over Na$_2$SO$_4$. The solvent was distilled off and the raw product was recrystallized from hexane/chloroform (8:2 V/V).

Yields:

1-benzyl-4-(chlorophenyl-methyl)-benzene (18): 16.1 g (55 mmol, 88%)

1-benzyl-4-[chloro-4-bromophenyl)methyl]-benzene (19): 20.1 g (54 mmol, 87%)

5. Production of Diph-PPX and Br-PPX through the Gilch Reaction

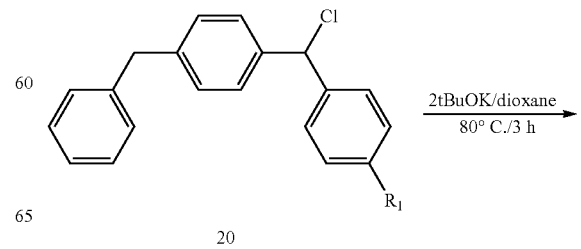

20

-continued

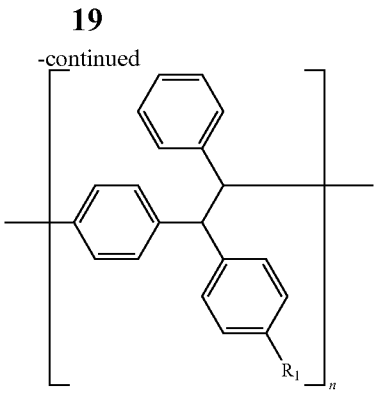

21

R1=H, Br

In the case where R1=H, DiPh-PPX (1) results, in the case where R1=Br, it concerns Br-PPX (2).

The Gilch polymerization was carried out under strict exclusion of oxygen. The solvent used, 1,4-dioxane, was dried over potassium/benzophenone. All solutions were degassed three times.

2.0 eq. potassium tert-butanolate was dissolved in a dipolar, aprotic solvent to a 0.2 molar solution and heated to boiling. Subsequently, 1.0 eq. of chloride dissolved in the same solvent (concentration 0.7 mol/l) was added within 3-5 sec. The reaction mixture was heated under reflux for 3 h and, subsequently, poured into ten times the amount of methanol, wherein the polymer obtained precipitated. This was filtered, dried, then dissolved in so much chloroform that a 10% solution formed, and reprecipitated again from ten times the amount of methanol. The cleaned product was dried at 60-80° C. and 20 mbar until the weight was constant.

Dioxane was used as solvent.

Yield:

Diph-PPX (1): 1.68 g (6.6 mmol; 81% of theor. yield)

Br-PPX (2): 2.11 g (6.3 mmol; 78% of theor. yield)

GPC:

| Diph-PPX (1) | $M_w$: 291800 | $M_n$: 127600 | D: 2.29 |
| Br-PPX (2) | $M_w$: 263100 | $M_n$: 117500 | D: 2.24 |

6. Production of F5-PPX

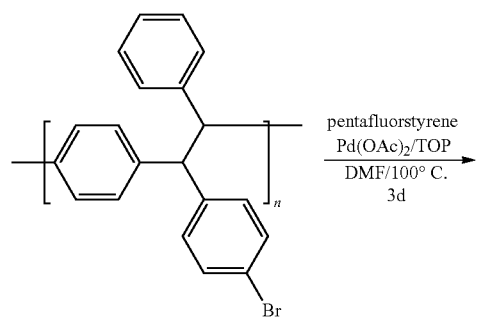

-continued

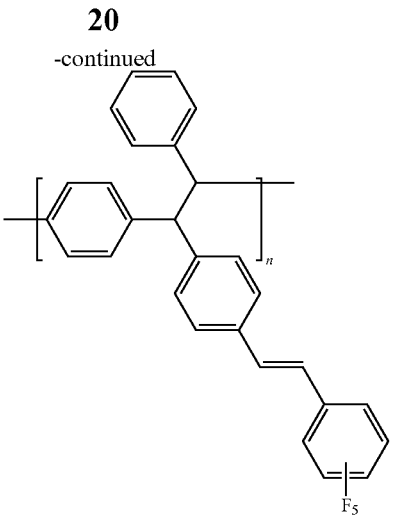

The production of F5-PPX (3) occurred through the polymer-analogous reaction of poly-(α-4-bromophenyl-α-phenyl)-PX with 2,3,4,5,6-pentafluorostyrene in a Heck reaction.

1.00 eq. Br-Diph-PPX was dissolved in a dipolar, aprotic solvent to a 0.05 molar solution. Subsequently, 3.00 eq. pentafluorostyrene, 1.1 eq. tributylamine, 0.06 eq. tri-o-tolylphosphine, 0.01 eq. palladium(II) acetate and 0.06 eq. hydroquinone were added and dissolved under stirring. The reaction mixture was degassed three times, saturated with argon and stirred for 3 days at 100° C.

After cooling to room temperature, the solution was filtrated over silica gel G60. Subsequently, 30 ml toluene was added and extracted with 60 ml 2N hydrochloric acid, 5% KOH solution and water, respectively. After drying over $Na_2SO_4$, the solvent was distilled off in high vacuum and the product was reprecipitated from DMF/MeOH.

Characterization:

Molecular Weights:

Mw: 550000 Mn: 125000 D: 4.4

Thermoanalysis:

$T_{5\%}$: 372° C.

$T_g$: 233° C.

Embodiments 1 to 10 (According to the Present Invention)

Comparative Embodiment 1 (Not According to the Present Invention)

Different copolymers of styrene and 2,3,4,5,6-pentafluorostyrene, produced according to synthesis embodiment 1, with the amount ratios of both monomers to each other indicated in table 1, as well as homopolymers of poly-2,3,4,5,6-pentafluorostyrene and polystyrene, were dissolved in THF: DMF (1:1 v/v) respectively, wherein the polymer concentration of each solution was 2 to 10 wt.-%. Similarly, poly-4-fluorostyrene or a copolymer of 2,3,4,5,6-pentafluorostyrene and BMDO was brought into solution.

Subsequently, the solutions were electrospun under the conditions summarized below, wherein one aluminum-coated PET-film, respectively, was used as a counter electrode.

Spinning Conditions:

Tension: 30-50 kV

Distance between electrodes: 10-20 cm

Diameter of the nozzle: 0.3 mm
Supply of the polymer solution: 0.15-0.40 ml/h
Coating period: 40-110 min The morphology of the polymer surfaces obtained in this way was determined with scanning electron microscopy (SEM).

Additionally the water-roll angle of the different homo- and copolymers used was measured with an apparatus as shown in FIGS. 4a and 4b.

With reference to FIGS. 4a and 4b, both metal tracks 11 and 13 are connected through a joint 15 and can be moved within the half-circle with angle scaling. For the measurement of the water-roll angle, the electrospun sample carrier 17 was fixed with adhesive tape on track 13 and the apparatus was placed on a smooth, level surface. A drop of water 19 was deposited on the substrate with a syringe and track 13 was slowly raised, see FIG. 4b. The water-roll angle, under which the drop of water slid from the underlayer, was read from a scale.

The morphologies of the polymer surfaces obtained in the embodiments 1 to 10 and in the comparative embodiments 1 (C) and 1 (D), as well as the water-roll angles of the polymer surfaces are summarized in tables 1 and 2.

Additionally, electron micrographs of individual polymer surfaces obtained in the aforementioned embodiments are depicted in FIGS. 2 Å to H, wherein the assignment of the figures to the individual embodiments and the concrete electrospinning conditions inserted in the individual embodiments shown in FIG. 2 are indicated in the following:

|  |  | Electrospinning conditions | | | | |
| --- | --- | --- | --- | --- | --- | --- |
| Figure | Embodiment | Polymer concentration (wt.-%) | Tension (kV) | Distance between electrodes (cm) | Polymer supply (ml/h) | Coating period (Min.) |
| 2 A | 2 | 2 | 40 | 18 | 1.0 | 50 |
| 2 B | 3 | 10 | 40 | 18 | 1.0 | 50 |
| 2 C | 6 | 2 | 40 | 18 | 0.7 | 50 |
| 2 D | 7 | 10 | 15 | 18 | 10.7 | 50 |
| 2 E | 8 | 10 | 40 | 18 | 0.7 | 50 |
| 2 F | 9 | 2 | 30 | 18 | 0.7 | 50 |
| 2 G | 10 | 10 | 50 | 18.5 | 0.34 | 50 |
| 2 H | Comp. emb. 1 | 2 | 30 | 20 | 0.35 | 40 |

Comp. emb.: comparative embodiment

As apparent from tables 1 and 2, hydrophobic polymer surfaces with a water-roll angle of less than 40° are obtained, respectively, with poly-2,3,4,5,6-pentafluorostyrene (embodiments 6 to 8), poly-4-fluorostyrene (embodiment 9) and the copolymers of pentafluorostyrene and styrene (embodiments 1 to 5) or of 2,3,4,5,6-pentafluorostyrene and 5,6-benzo-2-methylene-1,3-dioxepane (embodiment 10), whereas the surface produced with polystyrene (comparative embodiment 1) is hydrophilic with a water-roll angle of more than 90°.

Additionally, it emerges from the results that copolymers of PFS and PS comprise a superhydrophobic effect with water-roll angles of 0°, when the portion of PFS, in relation to the polymer, is at least of 30 mol percent and the polymer surface is comprised of particles with an average diameter of 2 μm to 3 μm or particles connected under each other via fibers with an average diameter of 2 μm to 3 μm (embodiments 2, 4 and 5) after electrospinning. The measurement of the contact angle with water was not possible for these surfaces due to the superhydrophobicity, as it was not possible to deposit a drop of water on these surfaces.

Embodiments 11 and 12 (According to the Present Invention) Comparative Embodiments 2 and 3 (Not According to the Present Invention)

Different homopolymers, produced according to synthesis embodiment 2, from DiPh-PPX (1), Br-PPX (2) and F5-PPX (3) were dissolved, respectively, in THF:DMF (1:1 v/v) with the polymer concentrations indicated in table 3.

Subsequently, the solutions were electrospun under the conditions summarized below, wherein one aluminum-coated PET-film, respectively, was used as a counter electrode.

|  | Electrospinning conditions | | | | |
| --- | --- | --- | --- | --- | --- |
| Embodiment | Tension (kV) | Nozzle diameter (mm) | Distance between electrodes (cm) | Polymer supply (ml/h) | Coating period (Min.) |
| 11 | 50 | 0.3 | 18.5 | 0.17 | 30 |
| 12 | 50 | 0.3 | 18.5 | 0.17 | 105 |
| Comp. emb. 2 | 50 | 0.3 | 12 | 0.17 | 105 |
| Comp. emb. 3 | 50 | 0.3 | 12 | 0.17 | 105 |

Comp. emb.: Comparative embodiment

The morphology of the polymer surfaces obtained in this way was determined with scanning electron microscopy (SEM). Additionally, the contact angle was determined according to DIN EN 828, and the water-roll angle was determined as in the embodiments 1 to 10.

The morphologies, as well as the contact/water-roll angles, of the polymer surfaces obtained in embodiments 11 and 12, as well as comparative embodiments 2 and 3, are summarized in table 3. Additionally, the electron micrographs of the polymer surfaces obtained in the aforementioned embodiments are indicated in FIGS. 3 Å to D.

As apparent from table 3, polymer surfaces which are significantly more hydrophobic are obtained with F5-PPX (3) than with Br-PPX (2) and DiPh-PPX (1).

Additionally, it emerges from the results that surfaces of F5-PPX in particle form (FIG. 2B), which are obtained through electrospinning a 2 wt.-% polymer solution, comprise a superhydrophobic effect with a water-roll angle of 0° and a contact angle of 160°. Polymer surfaces of F5-PPX in fiber form (FIG. 2A), which are obtained through electrospinning a 10 wt.-% polymer solution, do still comprise excellent hydrophobicity, with contact angles of 140° and water-roll angles of 30 to 400, however, are not superhydrophobic.

All of the characteristics and advantages originating from the claims, description, figures and embodiments, including constructive details, spatial arrangements and processing steps, are suitable for being essential to the invention, both in themselves and in the most different combinations.

LIST OF REFERENCE NUMERALS

1 Power supply
2 Capillary nozzle
3 Syringe
4 Polymer solution
5 Counter electrode
6 Fiber formation
7 Fiber mat

The invention claimed is:

1. A hydrophobic coating consisting of a polymer surface being formed of at least one homo- or copolymer, which has at least one side chain having at least one fluoro-substituted aryl group, wherein said homopolymer is a polymer selected from the group consisting of poly-2,3,4,5,6-pentafluorostyrene, poly-2-fluorostyrene, poly-3-fluorostyrene, poly-4-fluorostyrene, F5-PPX (poly-p-xylene), as well as homopolymers of 2-fluoroaryl-/3-fluoroaryl-/4-fluoroaryl-/ and 2,3,4,5,6-pentafluoroaryl-substituted vinyl monomers and wherein said copolymer is formed of a monomer selected from the group consisting of 2,3,4,5,6-pentafluorostyrene, 2-fluorostyrene, 3-fluorostyrene, 4-fluorostyrene, F5-PPX (poly-p-xylene), and combinations thereof and a monomer selected from the group comprising styrene, substituted styrene derivatives, 5,6-benzo-2-methylene-1,3-dioxepane, methyl methacrylate, N-phenylmaleimide and combinations thereof, wherein the polymer surface is produced through an electrospinning method.

2. The hydrophobic coating according to claim 1, wherein the at least one fluoro-substituted aryl group is a mono-, di-, tri-, tetra- or pentafluorophenyl group.

3. The hydrophobic coating according to claim 1, wherein the at least one fluoro-substituted aryl group is a 2,3,4,5,6-pentafluorophenyl-, 2-fluorophenyl-, 3-fluorophenyl- or 4-fluorophenyl group.

4. The hydrophobic coating according to claim 1, wherein the at least one fluoro-substituted aryl group is covalently bound over a spacer group.

5. The hydrophobic coating the of claim 4, wherein the spacer group is one of a $C_1$-$C_{20}$ alkyl group, a $C_1$-$C_5$ alkyl group and a methylene or ethylene group, or the at least one fluoro-substituted aryl group is covalently bound directly to the primary polymer chain.

6. The hydrophobic coating according to claim 1, wherein the at least one homo- or copolymer comprises at least 10 mol-% fluoro-substituted aryl groups.

7. The hydrophobic coating of claim 6, wherein the at least one homo- or copolymer comprises at least 20 mol-% fluoro-substituted aryl groups.

8. The hydrophobic coating of claim 7, wherein the at least one homo- or copolymer comprises at least 30 to 70 mol-% fluoro-substituted aryl groups.

9. The hydrophobic coating of claim 1, wherein the weight-averaged molecular weight of the at least one homopolymer or copolymer is 10,000 to 1,000,000 g/mol.

10. The hydrophobic coating of claim 9, wherein the weight-averaged molecular weight of the at least one homopolymer or copolymer is 50,000 to 300,000 g/rnol.

11. The hydrophobic coating according to claim 1, wherein the at least one homo- or copolymer comprises a weight-averaged molecular weight of 1,000 to 2,000,000 g/mol.

12. The hydrophobic coating of claim 11, wherein the particles of the polymer surface comprise an average diameter of between 1 nm and 2 µm.

13. The hydrophobic coating of claim 12, wherein the particles of the polymer surface comprise an average diameter between 500 nm and 1 µm.

14. The hydrophobic coating according to claim 1, wherein the polymer surface is formed in the form of particles or particles connected through fibers.

15. The hydrophobic coating according to claim 14, wherein the particles of the polymer surface comprise an average diameter of less than 3 µm.

16. The hydrophobic coating according to claim 15, wherein the surface comprises a contact angle of at least 140° in water.

17. The hydrophobic coating according to claim 16, wherein the surface comprises a contact angle of at preferably of at least 160° in water.

18. The hydrophobic coating according to claim 1, wherein the surface comprises a contact angle of at least 120° in water.

19. The hydrophobic coating according to claim 1, wherein the surface comprises a water-roll angle of maximally 50°.

20. The hydrophobic coating according to claim 1, wherein the surface comprises a water-roll angle of maximally 40°.

21. The hydrophobic coating according to claim 20, wherein the surface comprises a water-roll angle of 0°.

* * * * *